US006667562B1

United States Patent
Heinrich

(10) Patent No.: US 6,667,562 B1
(45) Date of Patent: Dec. 23, 2003

(54) DEVICE FOR DETECTING THE ADJUSTMENT OF TRANSLATIONALLY MOVED ADJUSTING DEVICES IN VEHICLES

(75) Inventor: Peter Heinrich, Hinternah (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/831,643

(22) PCT Filed: Nov. 12, 1999

(86) PCT No.: PCT/DE99/03662

§ 371 (c)(1),
(2), (4) Date: May 10, 2001

(87) PCT Pub. No.: WO00/29701

PCT Pub. Date: May 25, 2000

(30) Foreign Application Priority Data

Nov. 13, 1998 (DE) .......................... 198 54 038

(51) Int. Cl.[7] ................ B60L 3/00; H02P 3/00
(52) U.S. Cl. .............. 307/10.1; 49/13; 180/289; 318/264
(58) Field of Search ............... 307/10.1, 326; 180/289, 287; 318/264–267, 281–286; 49/13, 14, 24, 26–28, 31; 340/438, 686

(56) References Cited

U.S. PATENT DOCUMENTS

| 5,187,381 A | * | 2/1993 | Iwasa et al. ........... 307/10.1 |
| 5,404,673 A | * | 4/1995 | Takeda et al. ............ 49/28 |
| 5,459,962 A | * | 10/1995 | Bonne et al. ............ 49/28 |
| 5,483,135 A | * | 1/1996 | Parks .................. 318/469 |
| 5,621,290 A | * | 4/1997 | Heller et al. ............ 318/466 |
| 5,872,436 A | * | 2/1999 | Bergmann et al. ......... 318/286 |
| 6,235,550 B1 | * | 5/2001 | Chan et al. ............. 438/52 |
| 6,472,836 B1 | * | 10/2002 | Uebelein et al. ......... 318/445 |

FOREIGN PATENT DOCUMENTS

| DE | 40 20 351 | 1/1992 |
| DE | 196 19 932 | 11/1997 |

OTHER PUBLICATIONS

International Preliminary Examination Report dated Aug. 11, 2000 received for International Application No. PCT/DE 99/03662 Filed Nov. 12, 1999.

* cited by examiner

Primary Examiner—Gregory J. Toatley, Jr.
(74) Attorney, Agent, or Firm—Christie, Parker & Hale, LLP

(57) ABSTRACT

The invention relates to a device for detecting the adjustment of translationally moved adjusting devices in vehicles, especially window lifters, sunroofs and similar, comprising a sensor, which emits a sensor signal that is dependent on the adjusting movement of the adjusting device to a circuit for evaluating the sensor signal. This sensor also detects the forces of acceleration that are exerted on the vehicle and emits a signal to the circuit that corresponds to these forces of acceleration, and is characteristically modified. The sensor signals are the evaluated.

30 Claims, 7 Drawing Sheets

Fig. 7
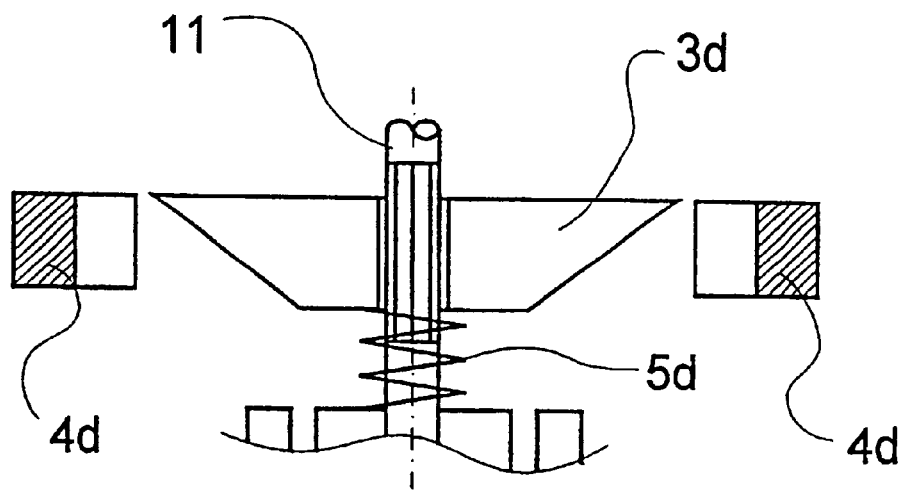
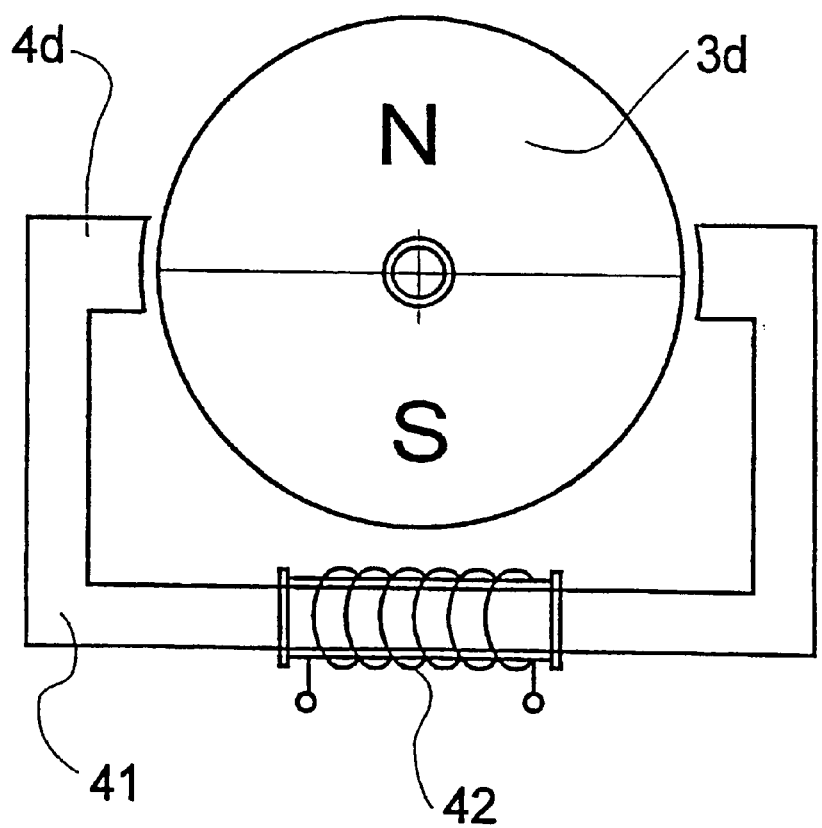

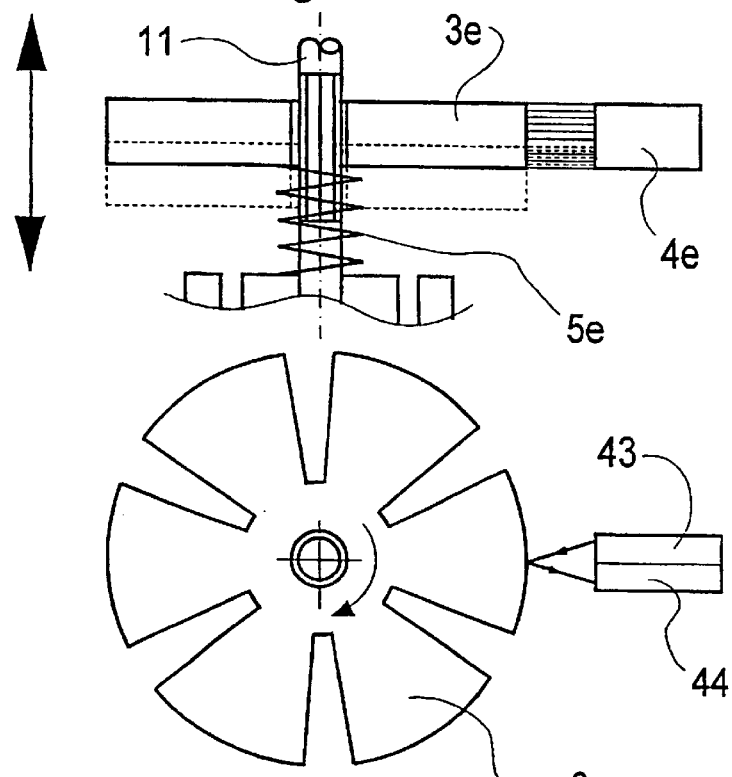
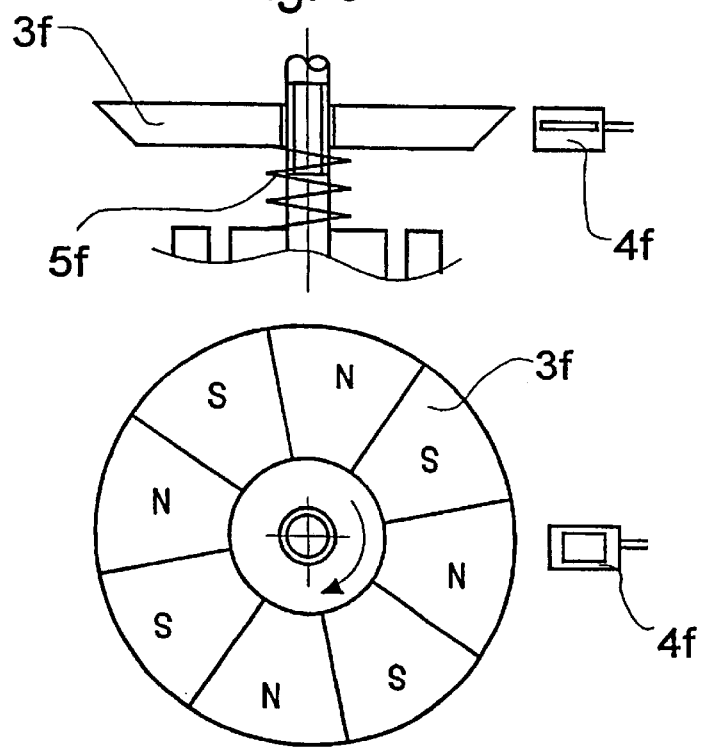

Fig. 10
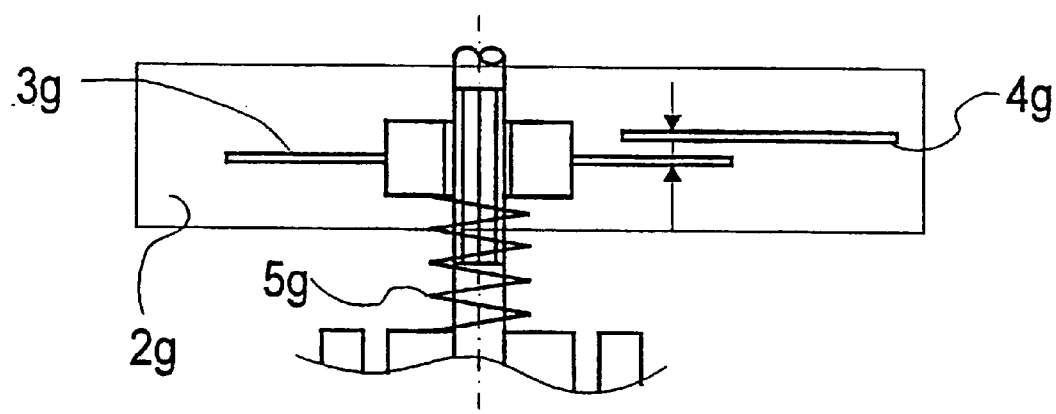
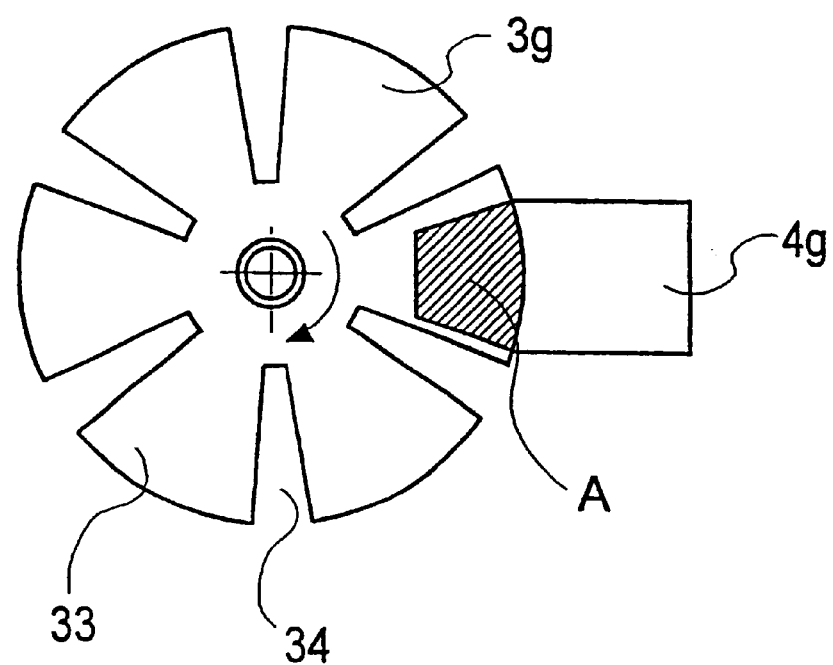

DEVICE FOR DETECTING THE ADJUSTMENT OF TRANSLATIONALLY MOVED ADJUSTING DEVICES IN VEHICLES

CROSS REFERENCE TO RELATED APPLICATION

This application claims priority of International application number PCT/DE99/03662 filed Nov. 12, 1999, which in turn claims priority to German patent application number 198 54 038.8, filed Nov. 13, 1998.

FIELD OF THE INVENTION

The invention relates to a device for detecting the adjustment of translationally moved adjusting devices in vehicles. More specifically, the invention relates to detecting forces of acceleration which act on the vehicle when driving over poor stretches of road.

BACKGROUND OF THE INVENTION

A process is known from DE 40 20 351 C2 for electronically monitoring and controlling the opening and closing of electrically operated assemblies wherein a setting member is connected to a sensor device which detects adjusting parameters originally linked with the adjusting movement of the setting member. This device is, for example, a sensor which indicates the degree of adjusting movement of a window pane. An additional sensor is installed in the vehicle in order to determine the forces of acceleration acting on the bodywork which were not originally linked with the adjusting movement of the setting member but which are required for triggering an anti-jam protection system to safeguard people and objects from becoming jammed between the window pane and door frame of a vehicle.

The drawback with this solution is that a second separate sensor element with corresponding supply leads and connectors is provided which increases the assembly and material costs.

From DE 196 19 932 A1, an electric motor servo drive is known which recognizes passing through potholes without any additional sensor. In this system, the duration of a revolution of the drive axle changes suddenly and non-uniformly resulting in the triggering of an anti-jam protection device.

The drawback with this solution is that the only forces of acceleration which are detected are those which exist in the adjusting direction. Furthermore, if the adjusting device is not moved, then no information on the forces of acceleration can be obtained.

Furthermore, acceleration switches are known which produce a contact with the occurrence of high accelerations, e.g., in an accident. With these switches, however, no statement on the degree of acceleration is possible since it is only determined that a boundary value is exceeded.

SUMMARY OF THE INVENTION

The object of the present invention is to provide an apparatus, with a small structural expense, which obtains as much information as possible on the adjusting movement of translationally movable adjusting devices and the forces acting on the vehicle.

According to the invention, vehicle acceleration information can be obtained without having to provide an additional sensor device. Thus, structural elements which are already present can be utilized to optimum effect. As a result, a sensor device which detects the rotary movement of an adjusting drive in order to slow down or switch off the drive upon reaching a certain position, can also detect the vibrating movement of a vehicle when driving over poor stretches of road. This information is of special importance for triggering an anti-jam protection device since the set trigger criteria can be falsified by the additional forces of acceleration.

Likewise, transverse accelerations when driving fast around bends can be determined. This data can be used for fixing the boundary values of the anti-jam protection or supplied to other control devices to, for example, influence an active chassis or brake control. It is likewise possible to determine severe acceleration or deceleration of the vehicle.

A further area of use of the present invention is in detecting the vibration of the adjusting drive. Driving off or starting up the engine can lead to vibration movements as a result of the breakaway forces and start-up torques which have to be overcome. With the present invention, it is possible to determine the start-up conditions which are based on external influences such as temperature or dampness. It is thus possible to, for example, standardize the threshold value for an anti-jam protection since, with stronger start-up vibrating movements, it is possible to determine a greater resistance such as a greater friction resistance of the adjusting device, so that the threshold value is correspondingly adjusted.

A quantitative evaluation of the vibrating movement is likewise possible. For example, based on the extent of the vibrating movement, it becomes possible to draw conclusions relating to the resistances in the adjusting device, for example, the wrong or correct installation, wear, or optimum operating conditions.

If the sensor detects the forces of acceleration acting on the vehicle in the direction of the adjusting movement, then the extra force acting on the adjusting device can be determined, and the threshold value of the anti-jam protection can be adjusted with less expense.

In one embodiment of the invention, the sensor includes several sensor elements associated with each other. For example, a first sensor element is connected to the adjusting device or to a drive for the adjusting device, and a second sensor element associated with the first sensor element is mounted independently of the first sensor element.

The present invention enables a determination of the forces which act on the vehicle when at least one of the sensor elements is supported resiliently directly on the vehicle chassis, or through the adjusting device or drive of the adjusting device on the vehicle chassis. If lasting or permanent displacements occur between the sensor elements, for example, following an accident, then it is possible to determine the displacement and, therefore, changed signal, about the effectiveness of the adjusting device and the degree of accident damage.

For reasons of minimizing wear and optimum detection of forces additionally acting on the vehicle, it is advantageous to mount the sensor elements substantially without contacting one another.

In a further development of the invention, a signal-transmitting sensor element (transmitter) sends a signal with constant amplitude and/or frequency. The amplitude and/or frequency changes detected by a signal-receiving sensor element (receiver) represent a function of the forces acting on the vehicle.

Preferably, the signal-transmitting sensor element has at least one partition with two sections of different signal levels. The signal-receiving sensor element is positioned relative to the signal-transmitting sensor element so that signals emanating from the sections of different signal levels and signal changes based on the displacements of the signal-transmitting sensor element and/or signal-receiving sensor element are detected. As a result, relevant adjusting movements and the acting forces can be simply and reliably detected.

In an another aspect of the invention, the circuit arrangement for evaluating the sensor signals sends an acceleration signal when the amplitude and/or frequency changes detected by the signal-receiving sensor element exceed a predetermined threshold value.

The circuit arrangement for evaluating the sensor signals has an amplifier connected to the output of the signal-receiving sensor element. The output of the amplifier is connected to the input of a first comparator. The other input of the comparator is attached to a first reference voltage source which corresponds to the predetermined threshold value of the amplitude change and at whose output the acceleration signal appears.

In a variation of the invention, a sensor determines the speed and/or rotary direction of the drive of the adjusting device through a signal transmitter connected to the drive shaft. A signal receiver is associated with the signal transmitter. The transmitter and receiver are mounted movable relative to each other and configured such that the signal receiver detects the relative movement between the signal transmitter and the signal receiver. The signal receiver sends sensor signals corresponding to the relative movements to the circuit arrangement.

This arrangement can be achieved if the signal transmitter is supported on the drive shaft elastically displaceable in the axial direction about a rest position, and the signal receiver detects the axial displacement of the signal transmitter. Alternatively, the signal transmitter can be fixed or connected to the drive shaft, and the drive shaft is mounted elastically displaceable in the axial direction about a rest position. It is also possible, however, for the signal receiver to be mounted elastically displaceable about a rest position in the axial direction of the drive shaft and/or perpendicular to the drive shaft.

In order to permit only certain movements of the signal receiver, for example, to fix the movements about a maximum deflection or to superimpose directions of movements, the signal receiver is designed displaceable along a guide path.

In one embodiment, the signal transmitter is formed from a ring magnet or a cylindrical multi-pole magnet. The signal receiver is formed from a Hall sensor aligned with the ring magnet or the sleeve face of the multi-pole magnet.

As an alternative embodiment, the sensor is constructed based on a magneto-resistive effect. A transmitter is formed as a cylindrical multi-pole magnet, and a receiver is formed as a magneto-resistive sensor. The receiver is aligned with the cylinder face of the multi-pole magnet.

In a further embodiment, an inductive sensor is provided with a signal transmitter e.g., a cylindrical magnetic disc, which rotates between the poles of a metal fork. An induction coil mounted on the metal fork serves as a signal receiver. Through the rotation of the magnet, a voltage is induced in the induction coil which changes in dependence on the movement of the disc relative to the fork.

In yet another embodiment, an opto-electronic sensor is utilized. The opto-electronic sensor includes a punctured or slit disc, a light-emitting element aligned with the end side of the punctured or slit disc, and a signal transmitter, preferably a photo-diode. In the reflection area of the rays reflected by the punctured e.g., or slit disc, a light-receiving element is provided as a signal receiver, preferably a photo-transistor. If the disc is displaced, only a part of the rays transmitted by the photo-diode is reflected. As a result, a corresponding change in the output signal of the photo-transistor is produced.

If the sensor is constructed as a capacitor, a part of the sensor device includes a rotating metal disc. The metal disc includes alternating regions of different dielectric constants, and a metal plate partially covering the circular surface of the metal disc.

In order for the adjusting drive or sensor device to have the greatest possible freedom with regard to the alignment of the axes of movement, a two-sided swivel lever with a vibrating mass is mounted on the lever arm remote from the signal transmitter. The lever arm is associated with the signal transmitter so that the signal transmitter is moved axially corresponding to the vibration of the mass. The lever is formed on the signal transmitter side as a fork which engages around the signal transmitter to allow displacement in both axial directions.

BRIEF DESCRIPTION OF THE DRAWINGS

The invention will now be explained in further detail with reference to the following figures:

FIG. 6 shows a section through a ring magnet used as signal-transmitting sensor element according to

FIG. 5;

FIGS. 7 to 10 show different designs of a sensor device;

DETAILED DESCRIPTION

Figure 1:
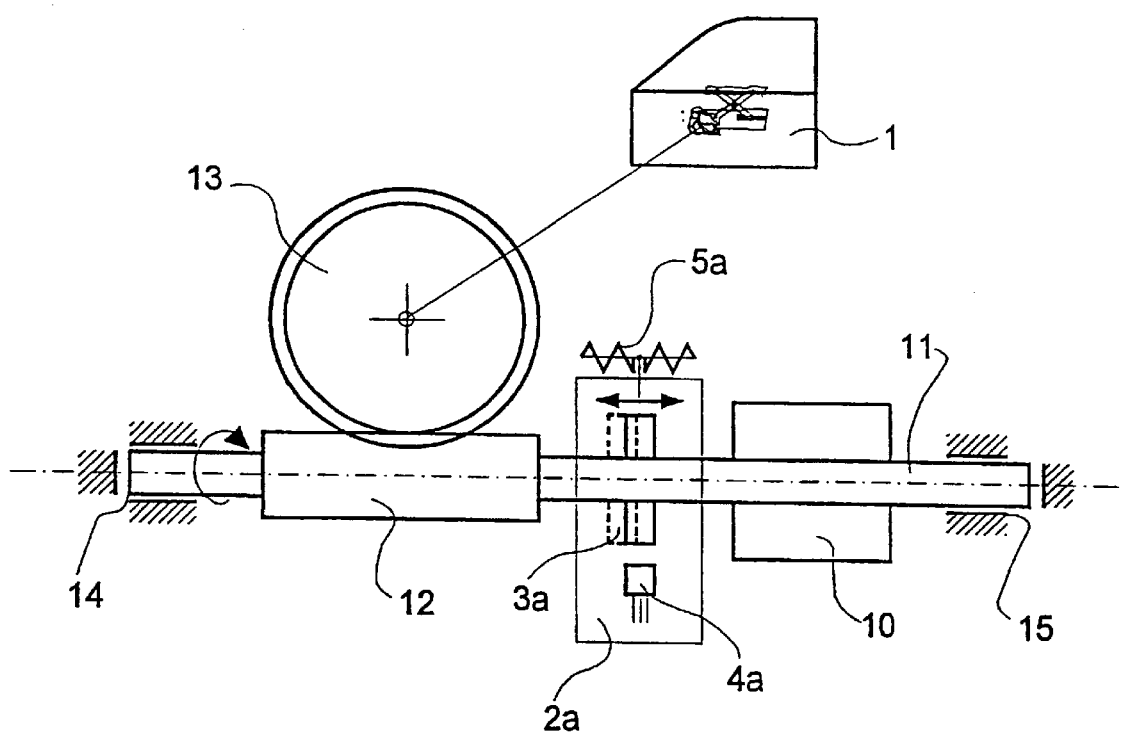
FIG. 1 shows the design principle of the apparatus.

FIG. 1 shows a design principle of the device according to the invention for detecting the displacement of translationally moved adjusting devices 1, for example, a window lifter drive in a vehicle door or a sunroof. The adjusting device 1 is connected to a drive device which includes an electric motor 10, a drive shaft 11 mounted fixed on the body in shaft bearings 14, 15 a worm 12, and a worm wheel 13 which actuates the adjustment of the window lifter. To accurately measure the forces acting on the vehicle, there is no or only very little bearing play in the longitudinal extension of the drive shaft 11.

The drive device is assigned a sensor 2a with a sensor element 4a fixed on the body, and a sensor element 3a secured against rotation to the drive shaft 11. The sensor element 4a is connected to a circuit arrangement for evaluating the sensor signals. This arrangement is used, for example, to detect the direction of rotation and/or the speed of the drive device and can be produced using a Hall sensor.

The sensor 2a detects the forces acting on the drive device. For this purpose, the sensor element 4a is a locally fixed, a signal-receiving sensor element 3a is formed as a signal-transmitting sensor element which rotates with the drive shaft 11. The signal-transmitting sensor element 3a is displaceable opposite the signal-receiving sensor element 4a in the direction of the double arrow in the longitudinal direction of the drive shaft 11 which is indicated by the rotating sensor element 3a shown off-set by dotted lines. The spring 5a indicates that the signal-transmitting sensor element 3a is supported resiliently against the body or against the drive device, or that the drive shaft is resiliently supported against the body. Thus, a displacement of the signal-transmitting sensor element 3a relative to the signal-receiving sensor element 4a will result in a change in the signal path which is dependent on the relative movement of the two sensor elements 3a, 4a. In this way, it is possible to detect by one sensor 2a both the rotary movement of the drive shaft and the component of acceleration in the direction along the drive shaft.

Since it is possible to decide on the magnitude of the acceleration force from the degree of displacement of the sensor element 3a, a quantitative determination of an acceleration force acting on the drive device and the adjusting device can be performed.

Figure 2:
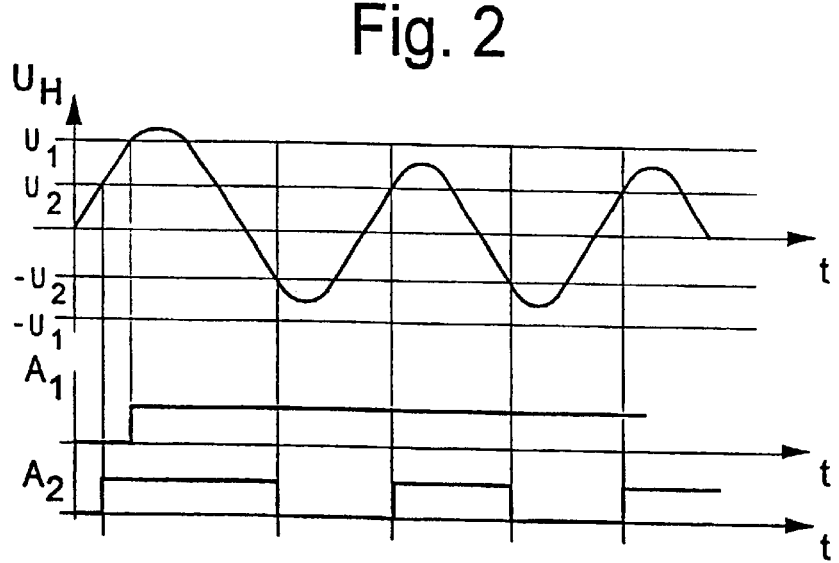
FIG. 2 shows a time chart of the output signal of a sensor with sensor elements fixed independently of each other, and the output signals of the circuit arrangement according to FIG. 3.

FIG. 2 shows the Hall voltage $U_H$ over time t received by a sensor 2a. Signals $A_1$ and $A_2$ over time t are produced by the circuit arrangement shown in FIG. 3.

Figure 3:
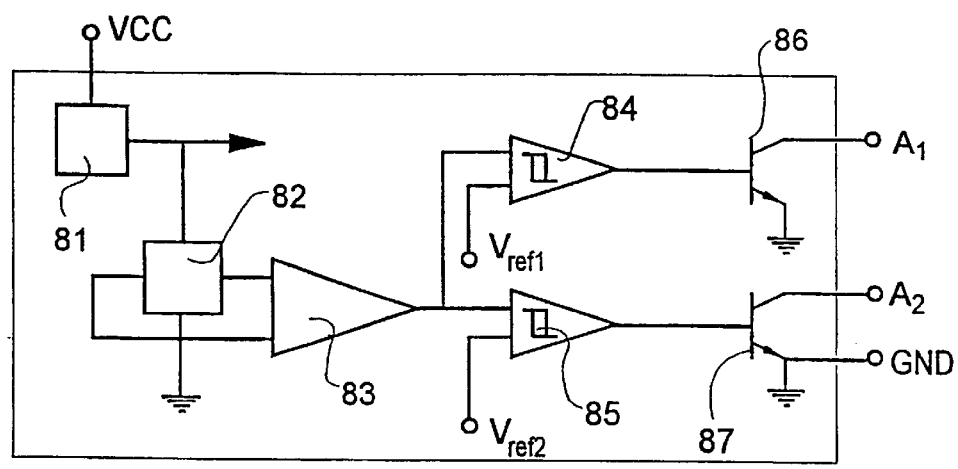
FIG. 3 shows a circuit arrangement for evaluating the sensor signals.

Referring to FIG. 3, a voltage regulator 81 produces a voltage and is connected to a Hall sensor 82. The signals produced by the Hall sensor 82 are supplied to an amplifier 83 whose output is connected to the inputs of two comparators 84, 85. Reference voltage sources Vref1, Vref2 are connected to respective comparators 84, 85 and produce respective reference voltages $U_1$ and $U_2$ which correspond to predetermined threshold values for triggering respective signals $A_1$ and $A_2$. If these values are exceeded or understepped, then the relevant signal $A_1$ or $A_2$ is emitted through the transistors 86, 87.

Referring back to FIG. 2, as can be seen from the lower curve, upon reaching the reference voltage $U_2$ the rising flank of the signal $A_2$ is released. Upon reaching the greater reference voltage $U_1$, the rising flank of the signal $A_1$ is released. The signal $A_2$ serves, for example, to detect the speed of the drive device, and in conjunction with an additional sensor or a circuit for detecting rotary direction, signal $A_2$ indicates forces acting on the adjusting device.

The signal $A_2$ falls back to zero when the voltage $U_H$ becomes greater than $-U_2$. The signal $A_1$ ceases when the voltage $U_H$ discharged from the signal-receiving sensor element falls below a predetermined value.

Figure 4:
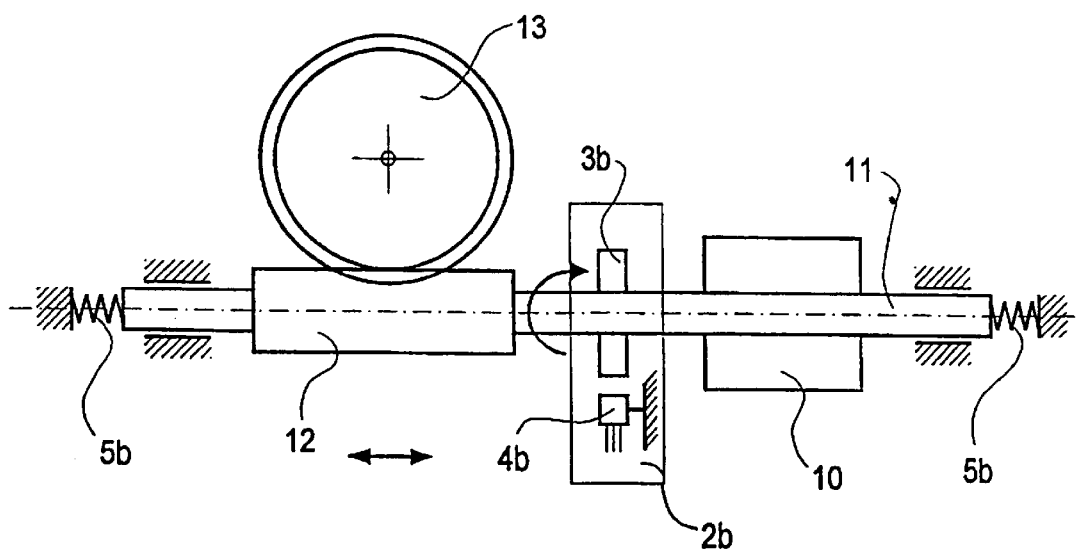
FIG. 4 shows an arrangement with an axially movable drive shaft and a signal-transmitting sensor element fixed thereon.

FIG. 4 shows an embodiment of the invention. The signal-receiving sensor element 3b is fixed or connected to the drive shaft 11. In order to allow the sensor elements 3b and 4b to move relative to each other when forces of acceleration appear, the entire drive is supported by springs 5b. Springs 5b are axially movable on the ends of the drive shaft 11. Thus, the influences of the adjusting device which flow in through the worm gearing (worm 12, worm wheel 13) can also be considered by the sensor 2b.

Figure 5:
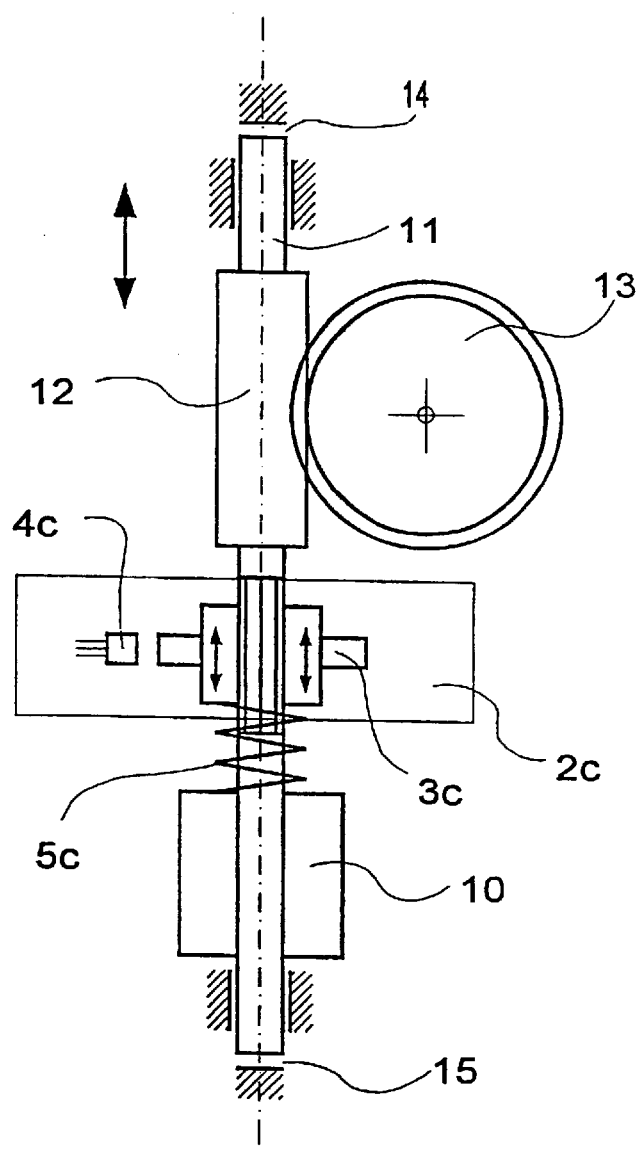
FIG. 5 shows a vertically mounted drive shaft with a signal-transmitting sensor element resiliently supported thereon.

Another type of alignment of a sensor 2c is shown in FIG. 5. The signal-transmitting sensor element 3c is formed as a ring magnet, and the signal-receiving sensor element 4c is formed as a locally fixed Hall sensor. The ring magnet is mounted longitudinally and displaceable in the direction of the double arrows on the drive shaft 11. The ring magnet is elastically mounted by a spring 5c which is supported by and fixed to the vehicle body. In the illustrated embodiment, pretension is produced in the spring 5c through the force of gravity so that the ring magnet is held in a rest position in the absence of forces of acceleration. The rest position is selected so that the Hall sensor 4c is directed to the ring magnets.

Figure 6:
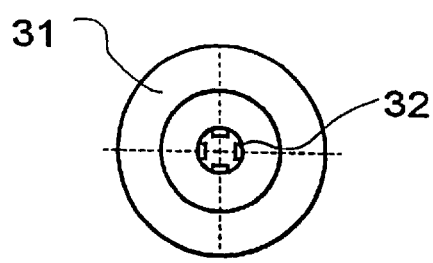

When driving over a poor stretch of road, the ring magnet 3c vibrates due to the vertical forces of acceleration. The vibration is detected by the Hall sensor and forwarded as sensor signals to a circuit arrangement for evaluation. In order to ensure that the ring magnet 3c is rotationally secured on the drive shaft 11 and simultaneously displaceable, the drive shaft 11 is provided with grooves in which a corresponding toothed area 32 of the ring magnet 31 engages, as shown in FIG. 6.

In an alternative embodiment, in FIG. 7, the signal-receiving element 4d works on an inductive basis and the signal-transmitting element 3d is formed as a frusto-conical magnetic disc with magnetization as shown in plan view on the lower illustration. Referring to the plan view, the signal-transmitting sensor element 3d includes an iron core 41 formed as a metal fork. An induction coil 42 is mounted on the metal fork. During rotation of the magnetic disc, a voltage is induced in the induction coil 42 as a result of the magnetic field strength changing in the iron core 41. The size of the voltage depends on the position of the magnetic disc in relation to the iron core 41. As a result of the frusto-conical shape of the magnetic disc, the voltage induced in the induction coil 42 changes during upward and downward movement of the magnetic disc owing to the changing field strength in the iron core 41.

Through the incline of the sides of the frusto-conical magnetic disc positioned opposite the signal-receiving sensor element 4d, the induced voltage is changed based on the deflection. Thus, the degree of the acceleration force can be determined.

FIG. 8 illustrates sensor elements based on an opto-electronic principle. The signal-transmitting sensor element 3e is formed as a slit disc supported elastically on the body by a spring 5e. Light rays emitted from the signal-receiving sensor element 4e are reflected from the circumference of the slit disc, received by the signal-receiving sensor element 4e, and converted into electrical signals. When the slit disc moves perpendicular to the disc surface, a part of the rays is not reflected since the reflection surface changes. As a result, the acceleration force acting on the slit disc, and thus, on the adjusting device, can be determined.

The signal-receiving sensor element 4e includes a combination of a photo-diode 43 and a photo-transistor 44.

FIG. 9 shows a similar construction of the sensor element as shown in FIG. 7. The sensor element 3f in FIG. 9 includes a magnetic disc formed as a multi-magnet disc, and the signal-receiving sensor element 4f includes a magneto-resistive element, e.g. a field plate. The multi magnet disc 3f has a frusto-conical shape so that through the incline of the sides of the frusto-conical magnetic disc opposite the signal-receiving sensor element 4f, the induced voltage is changes based on the deflection. Thus, the degree of the acceleration force can be determined.

FIG. 10 shows the interaction of a signal transmitter 3g and a signal receiver 4g on a capacitive basis. The signal transmitter 3g is formed as a rotating metal disc with alternating areas 33, 34 of different dielectric constants. The metal disc is partially covered by a metal plate mounted at a distance d from the metal disc. Since the metal disc is supported axially and movable through the spring 5g, the distance d can change in depending on the acceleration force. The capacitance is inversely proportional to the distance d. Through a radial shift of the metal plate 4g, a change of the capacitance can be detected through the change in the covered surface A. Thus, this principle can be used to detect acceleration forces in several directions.

Figure 11:
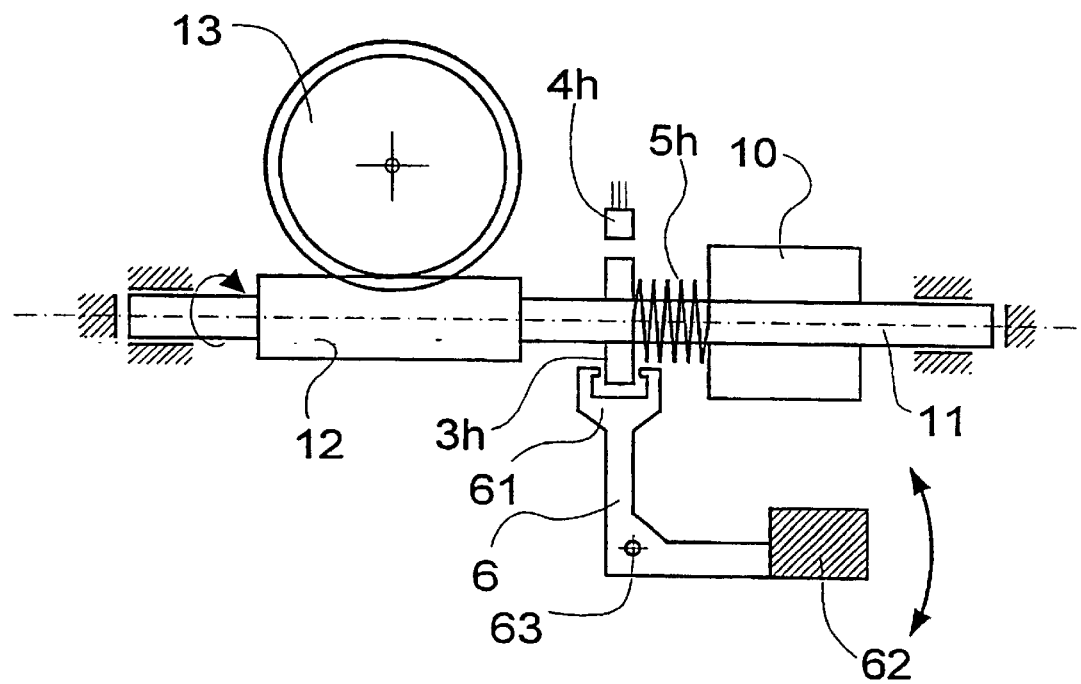
FIG. 11 shows a sensor device with a swing lever for converting vertical movements into horizontal movements.

In order to allow the drive unit to be independent to permit alignment of the drive shaft 11, according to FIG. 11, a vibrating mass 62 is attached to an angular lever arm 6 which is movable about a rotary axis 63. A fork 61 is coupled to the end of the lever arm 6 opposite the vibrating mass 62. During upward and downward movement of the mass 62, the fork 61 moves the signal-transmitting sensor element 3h to the left and right from its rest position. Using different lever ratios, different sensitivities can be set.

Similarly, through a corresponding angular position of the lever arm, any force in one direction can be detected independently of the alignment of the drive shaft 11.

Other spring elements besides spring 5a–h can also be used. Also, a resilient support of the signal-transmitting sensor element, the signal-receiving sensor element, or both sensor elements is possible if these variations are supported, for example, on different component parts, in different directions, and/or through different spring elements.

Figure 12:
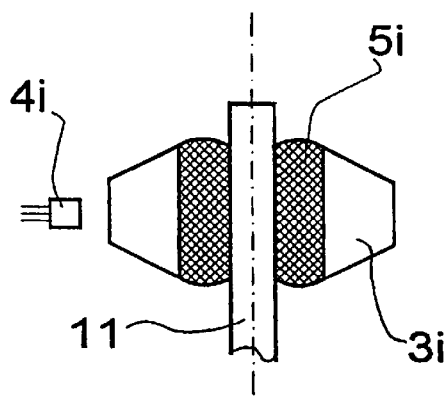
FIG. 12 shows a of a signal-transmitting sensor element resiliently fixed on a drive shaft, and the signal-receiving sensor element fixed on the bodywork.

FIG. 12 shows a signal-transmitting sensor element 3i fixed on a drive shaft 11 through a rubber-elastic spring element 5i, which allows movement of the signal-transmitting sensor element 3i in all directions. Thus, signal-receiving sensor element 4i is locally mounted or fixed.

Figure 13:
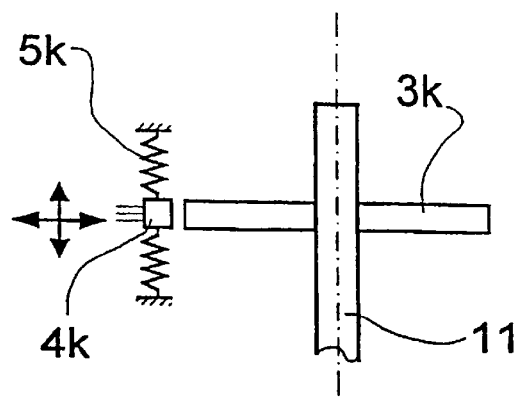
FIG. 13 shows a resilient arrangement of the signal-receiving sensor element, and fixing of the signal-transmitting sensor element on a drive shaft.

As an alternative, in FIG. 13, a signal-receiving sensor element 4j is mounted to be freely movable through spring 5k. The sensor element 4k is aligned in the rest position to the locally fixed rotating signal-transmitting sensor element 3k. The signal-receiving sensor element 4k can also be fixed through other spring elements on the body or on the drive. It is also possible that the signal-transmitting sensor element does not turn, but is encircled by the signal-receiving sensor element.

What is claimed is:

1. An apparatus for detecting an adjustment of a translationally movable adjusting device in a vehicle, comprising:
   a sensor configured to:
      send a sensor signal which is dependent on an adjusting movement of the translationally movable adjusting device,
      detect an acceleration force acting on the vehicle, and
      emit a modified signal corresponding to the acceleration force; and
   a circuit for evaluating the sensor signal and the modified signal, the circuit configured to determine an adjustment of the translationally movable adjusting device.

2. The apparatus according to claim 1, wherein the sensor is configured to detect the acceleration force acting on the vehicle in a direction of the adjusting movement.

3. The apparatus according to claim 1, the sensor comprising:
   a plurality of associated sensor elements, wherein
      a first sensor element is connected to one of the translationally movable adjusting device and a drive for the translationally movable adjusting device, and
      a second sensor element is associated with the first sensor element,
      the second sensor element being mounted independently of the first sensor element.

4. The apparatus according to claim 3, wherein at least one of the plurality of associated sensor elements is supported resiliently directly on the vehicle chassis.

5. The apparatus according to claim 3, wherein each of the plurality of the associated sensor elements is mounted without contacting each other.

6. The apparatus according to claim 5, wherein
   the first sensor element of the plurality of the associated sensor elements comprises a transmitting sensor element configured to emit a constant signal, and
   changes in the constant signal are a function of the acceleration force acting on the vehicle.

7. The apparatus according to claim 6, wherein
   the transmitting sensor element comprises a partitioning with first and second sections having different signal levels,
   the second sensor element of the plurality of the associated sensor elements comprises a receiving sensor element configured to detect the constant signal, and
   the receiving sensor element is positioned relative to the transmitting sensor element such that signals from the first and second sections of different signal levels and signal changes based on displacements of at least one of the transmitting sensor element and the receiving sensor element are detected.

8. The apparatus according to claim 1, wherein the circuit for evaluating the sensor signal and the modified signal emits an acceleration signal when at least one of an amplitude and a frequency modification detected by a receiving sensor element exceeds a predetermined threshold value.

9. The apparatus according to claim 8, wherein the circuit for evaluating the sensor signal and the modified signal comprises:
   an amplifier connected to an output of the receiving sensor element, and
   a comparator, wherein an output of the amplifier is connected to a first input of the comparator, and a second input of the comparator is coupled to a reference voltage which corresponds to a predetermined threshold value of the amplitude modification.

10. The apparatus according to claim 1, the sensor comprising:
   a transmitting sensor element, and
   a receiving sensor element,
   the receiving and sensor element being associated with the transmitting sensor element, the elements being movable relative to each other,
   the apparatus further comprising:
      a drive including a drive shaft, the drive shaft being connected to the transmitting sensor element, and
      the receiving sensor element being configured to detect a movement of the drive shaft,
   wherein the movement detected by the receiving sensor element is at least one of:
      a speed of the drive, and a rotary direction of the drive, and a relative movement between the transmitting sensor element and the receiving sensor element, and wherein the receiving sensor element sends sensor signals to the circuit.

11. The apparatus according to claim 10, wherein the transmitting sensor element is displaceably and elastically supported on the drive shaft in an axial direction about a rest position, and the receiving sensor element detects an axial displacement of the transmitting sensor element.

12. The apparatus according to claim 10, wherein the transmitting sensor element is connected to the drive shaft, and the drive shaft is elastically and displaceably mounted in an axial direction about a rest position.

13. The apparatus according to claim 10, wherein the receiving senor element is elastically and displaceably mounted about a rest position in an axial direction of the drive shaft.

14. The apparatus according to claim 13, wherein the receiving sensor element is displaceable along a guide path.

15. The apparatus according to claim 1, the sensor comprising:

a transmitting sensor element, and a receiving sensor element, wherein the transmitting sensor element comprises at least one of a ring magnet and a cylindrical multi pole magnet.

16. The apparatus according to claim 1, wherein the sensor comprises a magneto-resistive sensor including a receiving sensor element and a transmitting sensor element, the transmitting sensor element comprising a cylindrical multi pole magnet, and the receiving sensor element being aligned with a cylinder face of the cylindrical multi pole magnet.

17. The apparatus according to claim 1, wherein the sensor comprises an inductive sensor including a receiving sensor element and a transmitting sensor element, the transmitting sensor element comprising a cylindrical magnetic disc, configured to rotate between poles of a metal fork, and the receiving sensor element comprising an induction coil positioned on the metal fork.

18. The apparatus according to claim 1, wherein the sensor comprises an optoelectronic sensor including:

a receiving sensor element, a transmitting sensor element, and an apertured disc, the transmitting sensor element comprising a light emitting element directed to an end face of the apertured disc, and the receiving sensor element comprising a light receiving element mounted in a reflection area of rays reflected by the apertured disc.

19. The apparatus according to claim 1, wherein the sensor comprises a capacitative sensor, the capacitive sensor comprising:

a rotating metal disc having alternating areas of different dielectric constants; and a metal plate partially covering a circular face of the metal disc.

20. The apparatus according to claim 1, the sensor comprising:

a transmitting sensor element, and a receiving sensor element, the apparatus further comprising:

a lever arm remote from and positioned to face the transmitting sensor element;

a two-sided swivel lever with a vibrating mass, the two-sided swivel lever being mounted on the lever arm is associated with the transmitting sensor element and positioned remote from and facing the transmitting sensor element, wherein the transmitting sensor element is axially movable corresponding to the vibrating mass.

21. The apparatus according to claim 20, wherein the two-sided swivel lever is formed on a side of the transmitting sensor element as a fork which engages around the transmitting sensor element.

22. The apparatus according to claim 1, the translationally movable adjusting device is one of:

a window lifter, and a sliding roof.

23. The apparatus according to claim 6, wherein the constant signal is one of:

an amplitude signal, and a frequency signal.

24. The apparatus according to claim 8, wherein the circuit for evaluating the sensor signal and the modified signal comprises:

an amplifier connected to an output of the receiving sensor element, and a comparator, wherein an output of the amplifier is connected to a first input of the comparator, and a second input of the comparator is coupled to a reference voltage which corresponds to a predetermined threshold value of the frequency modification.

25. The apparatus according to claim 15, wherein the receiving sensor element comprises a Hall sensor, and wherein the Hall sensor is aligned with the ring magnet.

26. The apparatus according to claim 1, the sensor comprising:

a transmitting sensor element, and a receiving sensor element, wherein the transmitting sensor element comprises a cylindrical multi pole magnet.

27. The apparatus according to claim 26, wherein the receiving sensor element comprises a Hall sensor, and wherein the Hall sensor is aligned with a face of the cylindrical multi pole magnet.

28. The apparatus according to claim 1, the sensor comprising:

a transmitting sensor element, and a receiving sensor element, wherein the receiving sensor element comprises a Hall sensor.

29. The apparatus according to claim 18, wherein the transmitting sensor element comprises a photo-diode.

30. The apparatus according to claim 18, wherein the receiving sensor element comprises a photo-transistor.

* * * * *

UNITED STATES PATENT AND TRADEMARK OFFICE
CERTIFICATE OF CORRECTION

PATENT NO. : 6,667,562 B1
DATED : December 23, 2003
INVENTOR(S) : Heinrich

It is certified that error appears in the above-identified patent and that said Letters Patent is hereby corrected as shown below:

Title page,
Item [73], Assignee, delete "Brose Fahrzeugteile GmbH & Co. KG, Coburg (DE)"
insert -- Brose Fahrzeugteile GmbH & Co. KG, Coburg, Coburg (DE) --
Item [57], ABSTRACT,
Line 10, delete "the", insert -- then --

Column 9,
Line 18, delete "senor", insert -- sensor --
Line 56, delete "capacitative", insert -- capacitive --

Column 10,
Line 7, after "element;", insert -- and --

Signed and Sealed this

Thirty-first Day of May, 2005

JON W. DUDAS
*Director of the United States Patent and Trademark Office*